(12) United States Patent
Haninger

(10) Patent No.: US 6,210,085 B1
(45) Date of Patent: Apr. 3, 2001

(54) MACHINE TOOL WITH A MACHINE PART

(75) Inventor: Rudolf Haninger, Seitingen (DE)

(73) Assignee: Chiron-Werke GmbH & Co KG

( * ) Notice: Subject to any disclaimer, the term of this patent is extended or adjusted under 35 U.S.C. 154(b) by 0 days.

(21) Appl. No.: 09/242,947

(22) PCT Filed: Apr. 27, 1998

(86) PCT No.: PCT/EP98/02480

§ 371 Date: Feb. 23, 1999

§ 102(e) Date: Feb. 23, 1999

(87) PCT Pub. No.: WO99/00216

PCT Pub. Date: Jan. 7, 1999

(30) Foreign Application Priority Data

Jun. 25, 1997 (DE) .............................................. 197 26 952

(51) Int. Cl.[7] .................................................. B23Q 11/14
(52) U.S. Cl. ........................ 409/135; 409/137; 409/235; 408/67; 29/DIG. 94; 29/DIG. 102
(58) Field of Search ..................................... 409/137, 136, 409/135, 235; 408/56, 67; 29/DIG. 94, DIG. 102

(56) References Cited

U.S. PATENT DOCUMENTS

| 3,511,129 | * | 5/1970 | Mullen ................................. 409/137 |
| 3,695,344 | | 10/1972 | Schnizler et al. . |

FOREIGN PATENT DOCUMENTS

| 3527491 | | 2/1986 | (DE) . |
| 1568475 | | 5/1969 | (FR) . |
| 531783 | | 1/1941 | (GB) . |
| 1200267 | * | 7/1970 | (GB) . |

OTHER PUBLICATIONS

Sep. 23, 1998 International Search Report from the European Patent Office.
1981 Erhohung der Thermischen Steife von Werkzeugmaschinentischen by Dr. S. Kissoczy from Maschinenbautechnik pp. 4, 162–167 with English abstract.

* cited by examiner

*Primary Examiner*—Daniel W. Howell
(74) *Attorney, Agent, or Firm*—Cummings & Lockwood

(57) ABSTRACT

A machine tool has a machine part (25) which undergoes temperature-dependent changes in length, and is equipped, where it comes into contact with coolant (23), with a thermal insulation layer (28).

4 Claims, 2 Drawing Sheets

MACHINE TOOL WITH A MACHINE PART

BACKGROUND OF THE INVENTION

1. Field of the Invention

The present invention relates to a machine tool having at least one machine part which undergoes temperature-dependent changes in length.

2. Related Prior Art

Machine tools of this kind are commonly known.

The problem of so-called thermal deflections occurs in almost all machine tools. When these machine tools are operated, certain machine parts heat up because of the heat generated in the working space due to the hot chips and the equipment being run. This heating in turn results in changes in length, which cause elongations to occur inside the machine tool.

A change in length in a guide rail, for example, can cause the position of an end switch or reference point to shift, so that all the concatenated dimensions dependent thereon become inaccurate. It is furthermore possible for the spacing between the workpiece table and the spindle axis to change, so that, in a manner of speaking, the preset machine parameters change.

The machining accuracy of the machine tool is thereby influenced, since in some circumstances the control system is proceeding from incorrect parameters. These thermal deflections vary depending on coolant use, number of operator door openings required, ambient temperature in the building, coolant temperature, etc., so that they cannot be completely compensated for by presettable parameter sets.

It is already known to sense this so-called temperature response instrumentally, and compensate for it on the basis of empirical values. For this purpose the applicant uses its method called "Thermocontrol," which is based on temperature and reference measurements, to take into account previously measured, known temperature responses in the control system. In the simplest case, the machine parameters to which the control system refers are modified as a function of temperatures measured in the working space of the machine tool.

It has now been found that although slow, low-amplitude temperature responses can be compensated for with this method, large temperature changes cannot be balanced out in this fashion.

SUMMARY OF THE INVENTION

In view of the above, it is an object of the present invention to improve the machine tool mentioned at the outset, in a physically simple fashion, in such a way that the temperature response can easily be compensated for.

In the case of the machine tool mentioned at the outset, this object is achieved, according to the present invention, in that the machine part is equipped, where it comes or can come into contact with coolant, with a thermal insulation layer.

The object underlying the invention is completely achieved in this fashion.

Specifically, the inventors of the present application have recognized that it is precisely the influence of the coolant which makes thermal deflections unmanageable. For example, the coolant supply system is continually being activated and deactivated as a workpiece is being machined in order to cool and/or flush (i.e. remove chips from) the tool and workpiece. This requires the use of very large quantities of coolant, which are collected in a chip sump together with the flushed-off chips, and recycled.

In addition, many machine tools are designed so that when the operator door is opened, this so-called sump flushing system is shut down so as not to soil the area around the machine tool or contaminate the air with coolant mist. In the inventors' experience, in some cases the door is opened in this fashion on a very irregular basis, for example if problems in the working sequence arise. It is therefore not possible to schedule how often the coolant supply system will be activated and deactivated.

Measurements at the applicant's premises have shown that activating the coolant supply system and then deactivating it results, especially in the region of the chip sump, in appreciable and, in particular, extremely rapid temperature changes which cannot readily be compensated for by simple temperature measurements and changes in the parameter set.

The invention does not take the approach of accounting for these findings by increasing the number of measurement points and/or refining the models in the control system which represent the temperature response of the machine tool; instead, according to the present invention, the thermal insulation layer is used.

The reason is that it has been found, surprisingly, that an insulation layer of this kind can effectively prevent or reduce the effect of large and rapid temperature changes which occur when the coolant is activated and then reactivated. The astonishingly simple idea thus consists in modifying, in particular degrading, the heat transfer between the machine part and the coolant.

Of itself, thermal insulation initially makes no sense at all in a closed working space that heats up as a whole, since in the case of a machine tool consisting predominantly of metal parts with good thermal conductivity, it cannot maintain local temperature differences when considered over the long term. The fundamental conception of the invention, however, is not an attempt to maintain local temperature differences; the intention here is rather to prevent the occurrence of short-term deviations from the more or less homogeneous temperature distribution in the working space.

Measurements have indicated that coolant suddenly striking a machine part can result in changes in length that can be in the range of more than 100 um/min. Thermal deflections of this kind of course result in large dimensional discrepancies during production. If this machine part is now covered with a thermal insulation layer, this thermal displacement gradient now falls in the range of only approx. 10 um/min, i.e. can be decreased to less than 10%.

In an improvement, it is preferred if the machine part is a planar part which is covered on one side with a thermal insulation layer.

The advantage here is that substantially planar parts are covered, which have a large heat transfer area with respect to the coolant so that their thermal deflections as a consequence of intermittent coolant flooding are significant.

It is further preferred if the thermal insulation layer is equipped with a covering.

This feature is advantageous in terms of design: on the one hand it prevents the thermal insulation layer from being damaged by hot chips. On the other hand, the chips cannot get caught on this covering, as would certainly be the case with a thermal insulation material that as a rule is porous.

It is further preferred if the machine part is the chip sump.

The advantage with this feature is that as the inventors have recognized, particularly large thermal deflections occur here because very large quantities of coolant are collected here. Surprisingly, the short-term large temperature changes in the chip sump also result in thermal deflections of the machine base, i.e. in changes in spacing between the workpiece table and the column carrying the spindle.

Surprisingly, it was found in experiments at the applicant's premises that the result of covering the chip sump with a thermal insulation layer as described above was to decrease the temperature response of the machine tool to such an extent that it could now be managed very easily with the known methods described initially.

It is preferred in this context if the thermal insulation layer comprises a foamed material, preferably, STYROPOR™ (polystyrene particle foam), the chip sump preferably being designed with a layer of foamed material approximately 2 cm thick.

This feature is advantageous in terms of design: common, economical, and easily acquired foamed material panels can be used to cover the machine part or chip sump.

Lastly, it is further preferred if the cover panel is sheet steel approximately 5 mm thick.

This feature is advantageous especially in conjunction with the chip sump, since it allows the thermal insulation layer to be walked on, which is often necessary during maintenance work.

Further advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is shown in the drawings and will be explained in more detail in the description below. In the drawings.

DETAILED DESCRIPTION OF A PREFERRED EMBODIMENT

Figure 1:
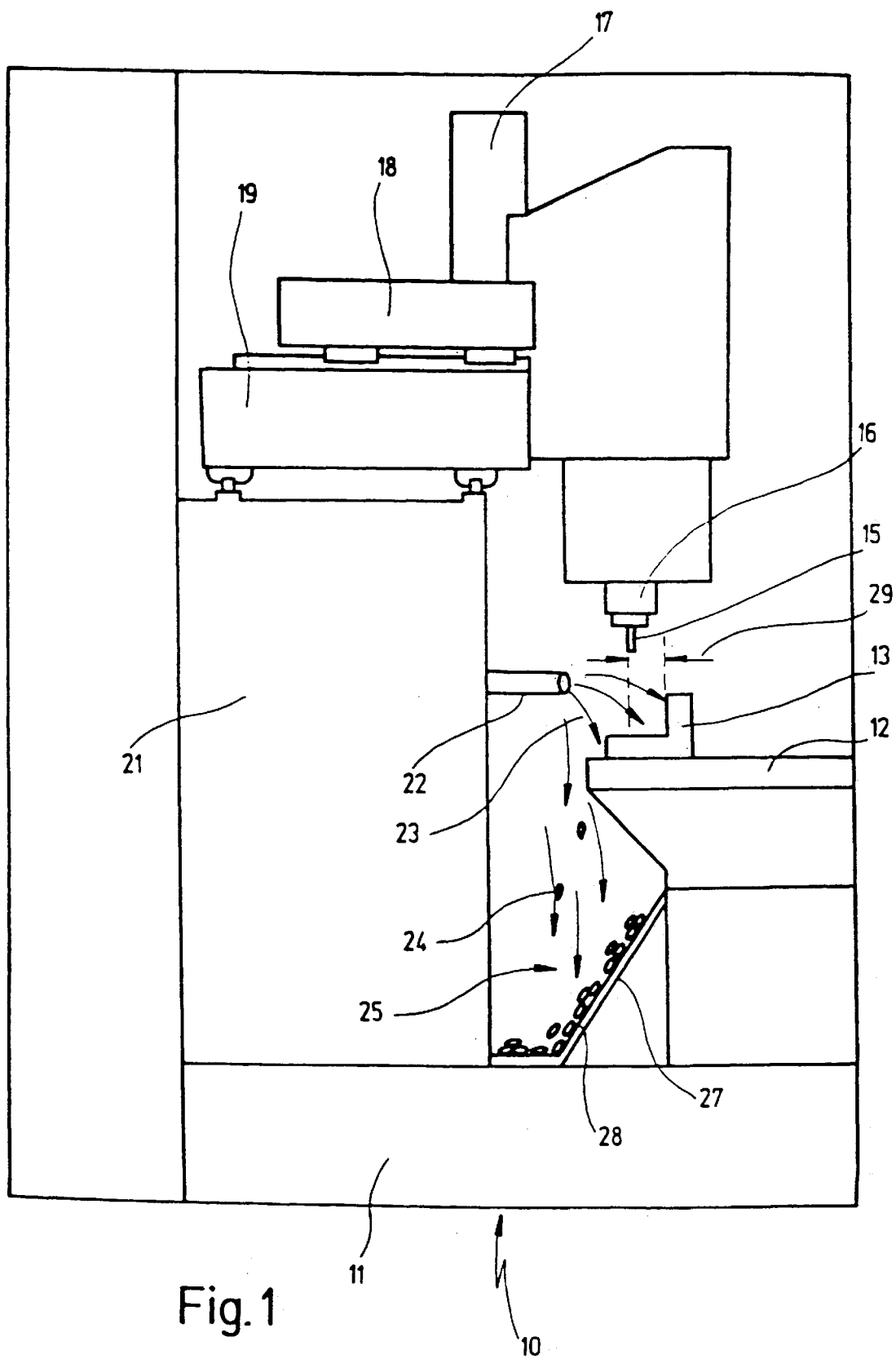
FIG. 1 shows a schematic side view of a machine tool in which the chip sump has a thermal insulation layer.

In FIG. 1, 10 designates in general a machine tool that is shown schematically in a side view. Machine tool 10 comprises a machine base 11 at the front of which is arranged a workpiece table 12 on which a workpiece 13 is clamped for machining.

Machining of workpiece 13 is accomplished by means of a tool 15 that is carried by a spindle 16. Spindle 16 is mounted in known fashion, adjustably as to height, on a column 17 which in turn sits on a first carriage 18 which is displaceable horizontally in the drawing plane in FIG. 1.

First carriage 18 sits on a second carriage 19 which can travel perpendicularly to the drawing plane of FIG. 1. Carriage 19 is in turn joined via a frame part 21 to machine base 11.

To this extent, machine tool 10 corresponds to a construction used by the applicant: tool 15 can be brought, by displacement of carriages 18 and 19 and of column 17, into any desired position with respect to workpiece 13 in order to machine the latter. During this machining, coolant 23 is delivered from a schematically indicated flushing tube 22 in order to cool workpiece 13 and tool 15 and flush away chips 24 that have been generated, so that they fall into a chip sump 25 in which coolant 23 also collects.

Chip sump 25 comprises first of all an angled panel 27 on which, according to the present invention, a thermal insulation layer 28 is applied.

When machine tool 10 of FIG. 1 is in a thermally steady state, a sudden activation of coolant 23 can result in a large change in the temperature of chip sump 25 and thus of base 11, as a result of which a spacing (indicated at 29) between tool 15 and workpiece 13 can change. These so-called thermal deflections are now prevented or greatly reduced by thermal insulation layer 28. Coolant which briefly strikes chip sump 25 and is then discharged outward into a coolant sump can now no longer greatly cool or heat up panel 27 and thus machine base 11, since heat transfer is considerably reduced by thermal insulation layer 28.

Figure 2:
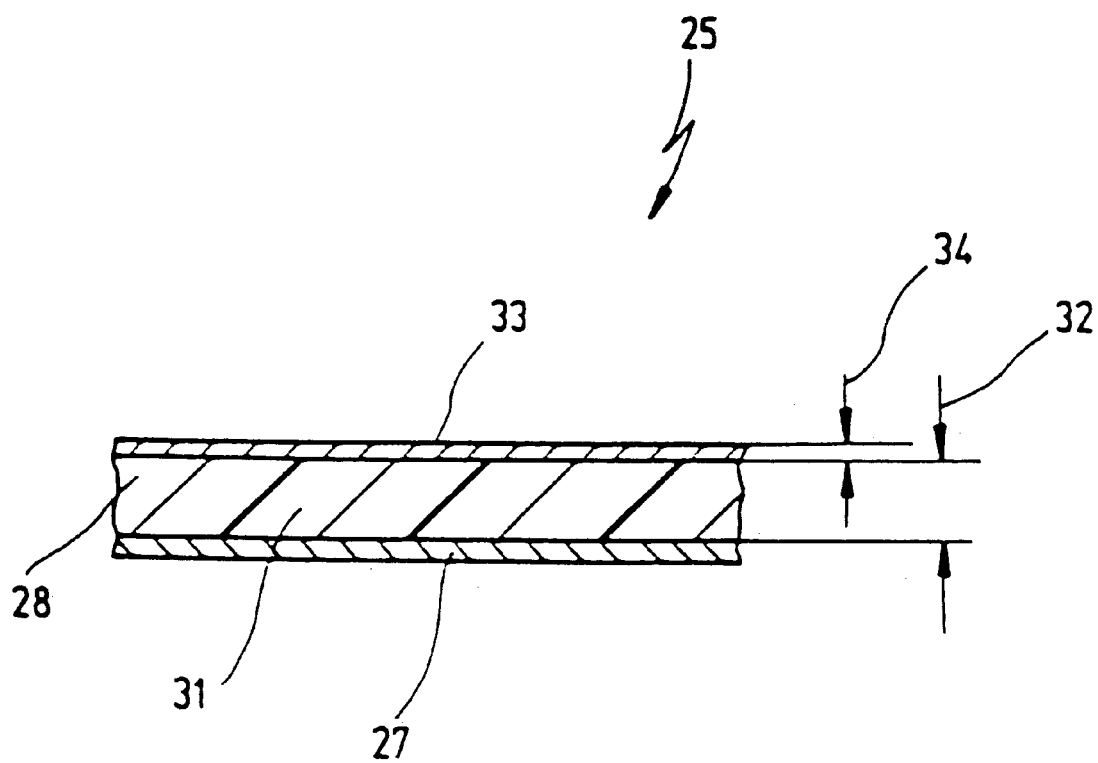
FIG. 2 shows a cross section through the chip sump of the machine tool of FIG. 1.

FIG. 2 shows a section through a portion of chip sump 25. It is evident that there rests on panel 27, as thermal insulation layer 28, a foamed material layer whose thickness (indicated at 32) is approximately 2 cm. Any commercially available, preferably hard foamed material, marketed for example under the trade name, STYROPOR™ (polystyrene particle foam), can be used as foamed material layer 31.

A cover panel 33, whose thickness (indicated at 34) corresponds to approximately 5 mm, rests on foamed material layer. The cover panel is a steel sheet which ensures that chip sump 25 can be walked on, and prevents chips from getting caught on thermal insulation layer 28.

Therefore, what I claim is:

1. A machine tool having a chip sump which undergoes temperature-dependent changes in length, wherein the chip sump is equipped, where it is vulnerable to come into contact with coolant, with a thermal insulation layer comprising a foamed material.

2. A machine tool as in claim 1, wherein the foamed material has a thickness of approximately 2 cm.

3. A machine tool having a chip sump which undergoes temperature-dependent changes in length, wherein the chip sump is equipped, where it is vulnerable to come into contact with coolant, with a thermal insulation layer having a covering whose thickness is about 5 mm.

4. The machine tool as in claim 3, wherein the cover panel is a steel sheet.

* * * * *